US012693163B2

(12) United States Patent
Lee et al.

(10) Patent No.: US 12,693,163 B2
(45) Date of Patent: Jul. 28, 2026

(54) WAVELENGTH MEASUREMENT CHIP AND WAVELENGTH MEASUREMENT SYSTEM

(71) Applicant: HUAWEI TECHNOLOGIES CO., LTD., Shenzhen (CN)

(72) Inventors: Cheewei Lee, Shenzhen (CN); Chao Pan, Shenzhen (CN); Stevanus Darmawan, Chiba (JP); Shaowu Wang, Dongguan (CN); Qian Wang, Shenzhen (CN); Huaqiang Qin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 18/344,303

(22) Filed: Jun. 29, 2023

(65) Prior Publication Data

US 2023/0341266 A1 Oct. 26, 2023

Related U.S. Application Data

(63) Continuation of application No. PCT/CN2021/134467, filed on Nov. 30, 2021.

(30) Foreign Application Priority Data

Dec. 30, 2020 (CN) .......................... 202011603792.3

(51) Int. Cl.
| | |
|---|---|
| *G01J 3/45* | (2006.01) |
| *G01J 3/02* | (2006.01) |
| *G02B 27/10* | (2006.01) |

(52) U.S. Cl.
CPC ............... *G01J 3/45* (2013.01); *G01J 3/0229* (2013.01); *G02B 27/1006* (2013.01)

(58) Field of Classification Search
None
See application file for complete search history.

(56) References Cited

U.S. PATENT DOCUMENTS

| | | | |
|---|---|---|---|
| 6,526,079 B1 | 2/2003 | Watterson et al. | |
| 8,237,102 B1 * | 8/2012 | Baehr-Jones ............. | G01J 9/04 |
| | | | 385/5 |

(Continued)

FOREIGN PATENT DOCUMENTS

| | | |
|---|---|---|
| CN | 103635785 A | 3/2014 |
| CN | 111157112 A | 5/2020 |

(Continued)

OTHER PUBLICATIONS

Feihong Chen et al., "Optimization of an NALM Mode-Locked All-PM Er:Fiber Laser System," IEEE Photonics Technology Letters, vol. 29, No. 23, December 1, 201; pp. 2119-2112 (4 total pages).

*Primary Examiner* — Michelle M Iacoletti
*Assistant Examiner* — Mohamed Doumbia
(74) *Attorney, Agent, or Firm* — Rimon PC

(57) ABSTRACT

An optical chip and a wavelength measurement system are disclosed. The optical chip includes an optical splitter configured to receive a first electromagnetic wave signal, and divide the first electromagnetic wave signal into two electromagnetic wave signals to be output. The optical chip also includes a first interferometer and a second interferometer, where the optical splitter, the first interferometer, and the second interferometer are disposed in sequential order. The first interferometer and the second interferometer are configured to receive one of the two electromagnetic wave signals, so that the one electromagnetic wave signal is interfered twice, to output a plurality of second electromagnetic wave signals. Another wave signal of the two electromagnetic wave signals is output as a third electromagnetic (Continued)

wave signal, and the second electromagnetic wave signal and the third electromagnetic wave signal may be used to obtain wavelength information of the first electromagnetic wave signal through optical-electrical conversion.

20 Claims, 4 Drawing Sheets

(56)                    References Cited

U.S. PATENT DOCUMENTS

| | | | |
|---|---|---|---|
| 9,964,703 | B2 | 5/2018 | Parker et al. |
| 2006/0050355 | A1 | 3/2006 | Godfreid et al. |
| 2006/0268948 | A1 | 11/2006 | May |
| 2010/0110443 | A1 | 5/2010 | Cheben et al. |
| 2011/0064360 | A1* | 3/2011 | Jeong .................... G02B 6/125 |
| | | | 385/39 |
| 2014/0092385 | A1 | 4/2014 | Nitkowski et al. |
| 2015/0085292 | A1* | 3/2015 | Uesaka ............. G02B 6/12007 |
| | | | 356/477 |
| 2017/0227399 | A1* | 8/2017 | Hu ........................ G02F 1/3136 |

FOREIGN PATENT DOCUMENTS

| | | | |
|---|---|---|---|
| JP | H10319262 A | | 12/1998 |
| JP | 2003207665 A | * | 7/2003 |
| JP | 2015068854 A | | 4/2015 |
| JP | 2020034775 A | | 3/2020 |
| WO | 2012132907 A1 | | 10/2012 |

* cited by examiner

10

WAVELENGTH MEASUREMENT CHIP AND WAVELENGTH MEASUREMENT SYSTEM

CROSS-REFERENCE TO RELATED APPLICATIONS

This disclosure is a continuation of International Application No. PCT/CN2021/134467, filed on Nov. 30, 2021, which claims priority to Chinese Patent Application No. 202011603792.3, filed on Dec. 30, 2020. The disclosures of the aforementioned applications are hereby incorporated by reference in their entireties.

TECHNICAL FIELD

This disclosure generally relates to the field of optical chips, and in particular, to a wavelength measurement chip and a wavelength measurement system to which the wavelength measurement chip is applied.

BACKGROUND

A wavelength meter is a measurement tool commonly used in microwave measurements, and is configured to measure a wavelength or frequency of a microwave signal source (such as an electromagnetic wave).

A conventional wavelength meter operates as an independent instrument that includes an optical path structure including a plurality of discrete components such as a lens, a curved mirror, an optical fiber, and a grating. In one aspect, the plurality of discrete components create a large package size with a high space utilization in conventional wavelength meters. Other conventional wavelength meters having the plurality of discrete components are poorly integrated and have poor reliability.

SUMMARY

Embodiments of this disclosure provide for a wavelength measurement chip and a wavelength measurement system. One aspect of this disclosure provides a wavelength measurement chip that includes an optical splitter that is configured to receive a first electromagnetic wave signal, and divide the first electromagnetic wave signal into two electromagnetic wave signals to be output. The wavelength measurement chip also includes a first interferometer and a second interferometer. The optical splitter, the first interferometer, and the second interferometer are disposed in sequential order, and the first interferometer and the second interferometer are configured to receive one of the two electromagnetic wave signals, so that the one electromagnetic wave signal is interfered by each of the first interferometer and the second interferometer to output a plurality of second electromagnetic wave signals.

Another wave signal of the two electromagnetic wave signals is output as a third electromagnetic wave signal, and the second electromagnetic wave signal and the third electromagnetic wave signal may be used to obtain wavelength information of the first electromagnetic wave signal through optical-electrical conversion.

The wavelength measurement chip may also include a substrate. The optical splitter, the first interferometer, and the second interferometer may then all be disposed on the substrate. The wavelength measurement chip is configured to receive the first electromagnetic wave signal, output the plurality of second electromagnetic wave signals and the third electromagnetic wave signal based on the first electromagnetic wave signal, convert the second electromagnetic wave signal and the third electromagnetic wave signal into electrical signals, and obtain wavelength information of the first electromagnetic wave signal based on the electrical signals. The wavelength measurement chip does not need to define a complex optical system. Compared with conventional wavelength meters, the wavelength measurement chip of this disclosure defines a simpler structure. This simpler structure reduces a package size and space utilization. In addition, components in the wavelength measurement chip have a compact structure, which improves a reliability of the wavelength measurement chip.

In some embodiments, the wavelength measurement chip defines a first path and a second path, the two electromagnetic wave signals are respectively transmitted along the first path and the second path, and a loss of the electromagnetic wave propagated along the first path is greater than a loss of the electromagnetic wave propagated in the second path.

The optical splitter divides the first electromagnetic wave signal into the two electromagnetic wave signals according to a preset proportion for the output. A proportion of the electromagnetic wave signal propagated in the first path in the first electromagnetic wave is greater than a proportion of the electromagnetic wave signal propagated in the second path in the first electromagnetic wave.

A value of the preset proportion is determined based on optical losses of the first path and the second path. Compared with the propagation of the electromagnetic wave in the second path, the propagation of the electromagnetic wave in the first path has a higher strength loss. Therefore, in this embodiment, a strength proportion of the electromagnetic wave signal output by the optical splitter to the first path in the first electromagnetic wave is set to be higher than that of the electromagnetic wave signal output to the second path in the first electromagnetic wave. This arrangement balances a difference between the strength loss of the electromagnetic wave signal in the first path and the strength loss of the electromagnetic wave signal in the second path.

In some embodiments, the first path includes the first interferometer and the second interferometer.

The first path includes the first interferometer and the second interferometer. When being propagated in the first path, the electromagnetic wave signal needs to pass through more components than those through which the electromagnetic wave signal passes when being propagated in the second path. Therefore, compared with the propagation of the electromagnetic wave in the first path, the propagation of the electromagnetic wave in the second path has a higher strength loss. A strength proportion of the electromagnetic wave signal output by the optical splitter to the first path in the first electromagnetic wave is set to be higher than that of the electromagnetic wave signal output to the second path in the first electromagnetic wave. This arrangement balances a difference between the strength loss of the electromagnetic wave signal in the first path and the strength loss of the electromagnetic wave signal in the second path.

In some embodiments, the first interferometer is a Mach-Zehnder interferometer, and the second interferometer is a multimode interferometer.

In some embodiments, there is a preset phase shift between the plurality of second electromagnetic wave signals output by the second interferometer, and the preset phase shift between the plurality of second electromagnetic wave signals can be adjusted by adjusting a quantity of the second electromagnetic waves output by the second interferometer.

The preset phase shift between the plurality of second electromagnetic wave signals can be adjusted by adjusting the quantity of the second electromagnetic waves output by the second interferometer, and a larger quantity of the second electromagnetic waves indicates more accurate wavelength measurement.

In some embodiments, the second interferometer outputs a quantity of four of the second electromagnetic wave signals, and a preset phase shift between the four electromagnetic wave signals is π/2.

In some embodiments, the wavelength measurement chip further includes a coupler. The coupler is configured to receive the first electromagnetic wave and transmit the first electromagnetic wave to the optical splitter.

Due to a disposition of the coupler in the wavelength measurement chip, the coupler receives the first electromagnetic wave signal and transmits the first electromagnetic wave signal to the optical splitter in a more conducive manner to reducing an input loss of the first electromagnetic wave signal as compared to conventional approaches. This arrangement improves an accuracy of the wavelength information measured by the wavelength measurement chip.

In some embodiments, the wavelength measurement chip further includes a high-order mode filter, and the high-order mode filter is disposed between the optical splitter and the first interferometer.

The high-order mode filter can reduce a high-order mode of the electromagnetic wave transmitted in the first path. Disposing the high-order mode filter between the optical splitter and the first interferometer increases an extinction ratio of the interferometer in the first path, thereby further improving the accuracy of the wavelength information measured by the wavelength measurement chip.

In some embodiments, the optical splitter, the first interferometer, and the second interferometer form the substrate.

Another aspect of this disclosure provides a wavelength measurement system that includes a wavelength measurement chip. The wavelength measurement chip may be the wavelength measurement chip according to any one of the foregoing items. The wavelength measurement system further includes a photoelectric detector that is coupled to the wavelength measurement chip and is configured to receive a second electromagnetic wave signal and a third electromagnetic wave signal and convert the second electromagnetic wave signal and the third electromagnetic wave signal into electrical signals. The wavelength measurement system further includes a processor that is electrically coupled to the photoelectric detector and is configured to obtain wavelength information of a first electromagnetic wave signal based on the electrical signals.

The wavelength measurement system provided in some embodiments includes the wavelength measurement chip. The wavelength measurement chip includes a substrate and an optical splitter. The wavelength measurement chip further includes a first interferometer and a second interferometer that are disposed on the substrate. The wavelength measurement chip is configured to receive the first electromagnetic wave signal, and output a plurality of second electromagnetic wave signals and a third electromagnetic wave signal based on the first electromagnetic wave signal. The wavelength measurement system further includes the photoelectric detector and the processor that are electrically coupled to each other, the second electromagnetic wave signal and the third electromagnetic wave signal are converted into the electrical signals by the photoelectric detector, and the wavelength information of the first electromagnetic wave signal is obtained by the processor based on the electrical signals. This arrangement facilitates for the wavelength measurement system to define a simple optical system. Compared with wavelength meters in conventional technologies, the wavelength measurement system defines a simpler structure, which helps reduce a package size and utilized space. In addition, components in the wavelength measurement chip 11 have a compact structure, which improves reliability of the wavelength measurement system.

In some embodiments, the processor is configured to obtain a plurality of wavelength values based on the plurality of second electromagnetic wave signals output by the second interferometer, and determine, from the plurality of wavelength values based on the third electromagnetic wave signal output by the optical splitter, a wavelength value as a wavelength value of the first electromagnetic wave signal.

A spectral image is regularly and periodically arranged, a determined signal strength may correspond to a plurality of wavelength values, and a wavelength value can be uniquely determined based on the third electromagnetic wave signal output by the optical splitter.

In some embodiments, the photoelectric detector has a sensing zone, the wavelength measurement chip has a coupling plane for outputting the second electromagnetic wave signal and the third electromagnetic wave signal, and the coupling plane is parallel to a plane on which the sensing zone is located.

In this way, transmission directions of the second electromagnetic wave signal and the third electromagnetic wave signal are perpendicular to the coupling plane, that is, perpendicular to a sensing zone. In this case, the second electromagnetic wave signal and the third electromagnetic wave signal can directly enter the photoelectric detector after being output from the coupling plane, and the transmission directions of the second electromagnetic wave signal and the third electromagnetic wave signal do not need to be specifically changed.

In some embodiments, the photoelectric detector has a sensing zone, and a plane on which the sensing zone is located is parallel to a plane on which the second electromagnetic wave and the third electromagnetic wave signal are propagated on the wavelength measurement chip.

In this way, the wavelength measurement chip, the photoelectric detector, and the processor are sequentially stacked, and there is no protrusion structure that is perpendicular to a direction of the wavelength measurement chip. This helps simplify a subsequent packaging process.

DESCRIPTION OF EMBODIMENTS

The following disclosure describes embodiments of this disclosure with reference to the accompanying drawings in embodiments of this disclosure.

Figure 1:
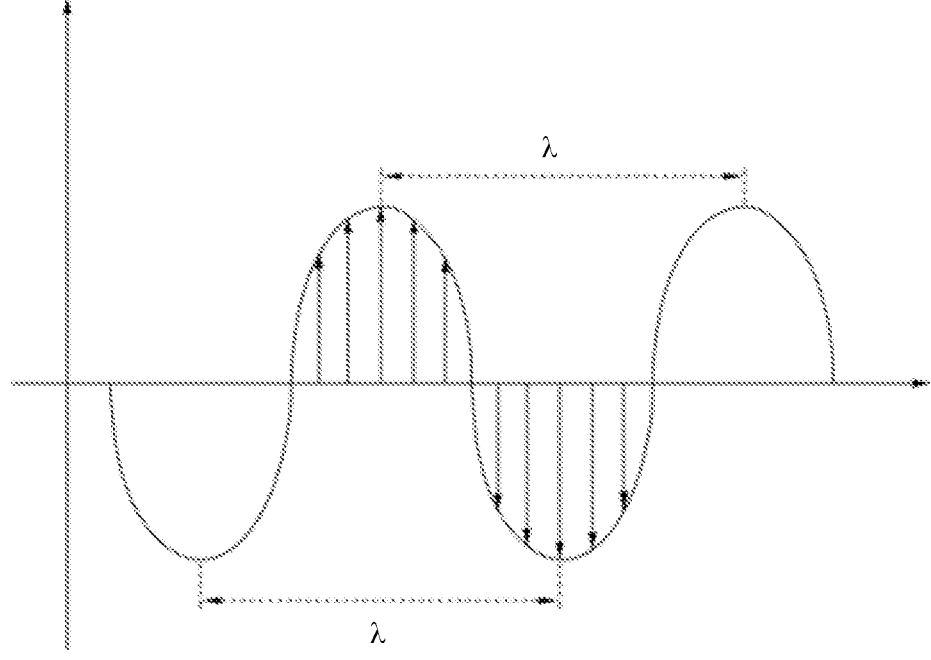
FIG. 1 is a schematic diagram of a propagation process of an electromagnetic wave.

As shown in FIG. 1, a horizontal axis indicates a propagation direction of an electromagnetic wave, and a vertical axis represents a vibration direction of the electromagnetic wave. A wavelength 2 of an electromagnetic wave is defined as a distance of propagation of the electromagnetic wave in a vibration cycle. In other words, the wavelength 2 of the electromagnetic wave is a distance between two adjacent points of which a difference between vibration phases is $2\pi$ along a propagation direction of the electromagnetic wave. For example, as shown in FIG. 1, a distance between two adjacent peaks is one wavelength, and a distance between two adjacent troughs is also one wavelength.

Figure 2:
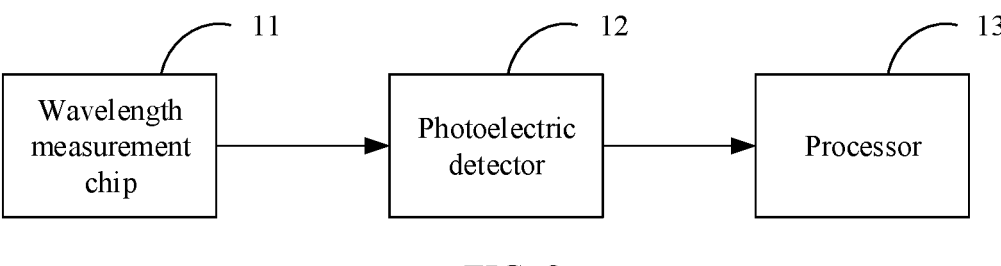
FIG. 2 is a schematic diagram of a module structure of a wavelength measurement system according to an embodiment of this disclosure.

As shown in FIG. 2, a wavelength measurement system 10 provided in an embodiment is configured to measure a wavelength of an electromagnetic wave, and may be applied to scenarios such as an ultra-dense wavelength-division multiplexing system, a wavelength selective switch, and a laser.

The wavelength measurement system 10 includes a wavelength measurement chip 11, a plurality of photoelectric detectors 12, and a processor 13. The photoelectric detector 12 is coupled to the wavelength measurement chip 11, and is electrically connected to the processor 13. The wavelength measurement chip 11 is configured to receive a first electromagnetic wave signal, and output a plurality of (in this disclosure, "a plurality of" means two or more) second electromagnetic wave signals and a third electromagnetic wave signal based on the first electromagnetic wave signal. The photoelectric detector 12 is configured to receive the plurality of second electromagnetic wave signals and the third electromagnetic wave signal, and generate electrical signals based on the plurality of second electromagnetic wave signals and the third electromagnetic wave signal. The processor 13 is configured to obtain wavelength information of the first electromagnetic wave signal based on the electrical signals.

Figure 3:
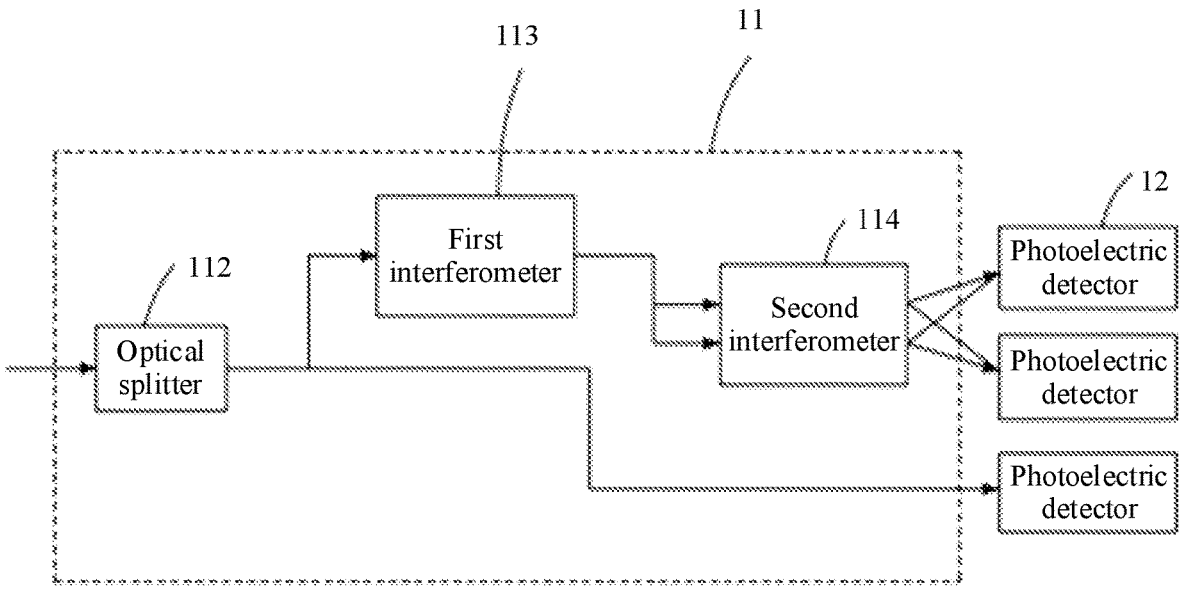
FIG. 3 is a schematic diagram of a plane structure of a wavelength measurement chip in FIG. 2.

The wavelength measurement chip 11 is a wavelength measurement chip based on a planar optical waveguide. As shown in FIG. 3, the wavelength measurement chip 11 includes an optical splitter 112, a first interferometer 113, and a second interferometer 114.

According to different propagation paths of the first electromagnetic wave signal, the wavelength measurement chip 11 defines a first path and a second path. In this embodiment, the first path includes the first interferometer 113 and the second interferometer 114. The first path further includes a waveguide structure (not shown in FIG. 3) that is coupled between adjacent components (for example, between the optical splitter 112 and the first interferometer 113, and between the first interferometer 113 and the second interferometer 114) and that is for guiding an electromagnetic wave signal. In this embodiment, the second path includes a waveguide structure (not shown in FIG. 3) for guiding an electromagnetic wave signal. The foregoing waveguide structure is a waveguide structure having a high refractive index difference. To be specific, the foregoing waveguide structure separately includes a waveguide core layer and a cladding layer covering the waveguide core layer. Both the core layer and the cladding layer are made from a silicon oxide material, but the core layer is doped, so that a refractive index of the core layer is higher than a refractive index of the cladding layer. Therefore, the waveguide structure can guide an electromagnetic wave.

The optical splitter 112 is a Y-shaped optical splitter, and is configured to receive the first electromagnetic wave signal, and divide the first electromagnetic wave signal into two electromagnetic wave signals for output. One electromagnetic wave signal is guided to the first path, and the other electromagnetic wave signal is guided to the second path.

The optical splitter 112 performs division according to a preset proportion to obtain the two electromagnetic wave signals. In other words, strengths of the two electromagnetic wave signals are in a preset proportion. For example, a ratio of a strength of the electromagnetic wave signal output by the optical splitter 112 to the first path to a strength of the electromagnetic wave signal output by the optical splitter 112 to the second path is equal to 9:1 or 5:5. A specific preset proportion is not limited in this disclosure.

A specific value of the preset proportion is determined based on optical losses of the first path and the second path. In this embodiment, the first path includes the first interferometer 113, the second interferometer 114, and a waveguide structure 115, and the second path includes only a waveguide structure 116. Therefore, when being propagated in the first path, the electromagnetic wave signal needs to pass through more components than those through which the electromagnetic wave signal passes when being propagated in the second path. When compared with the propagation of the electromagnetic wave in the first path, the propagation of the electromagnetic wave in the second path has a higher strength loss. Therefore, in this embodiment, the strength of the electromagnetic wave signal output by the optical splitter 112 to the first path is set to be greater than the strength of the electromagnetic wave signal output to the second path, that is, a strength proportion of the electromagnetic wave signal output by the optical splitter 112 to the first path in the first electromagnetic wave is set to be greater than the strength proportion of the electromagnetic wave signal output to the second path in the first electromagnetic wave. This arrangement balances a difference between the strength loss of the electromagnetic wave signal in the first path and the strength loss of the electromagnetic wave signal in the second path.

Figure 4:
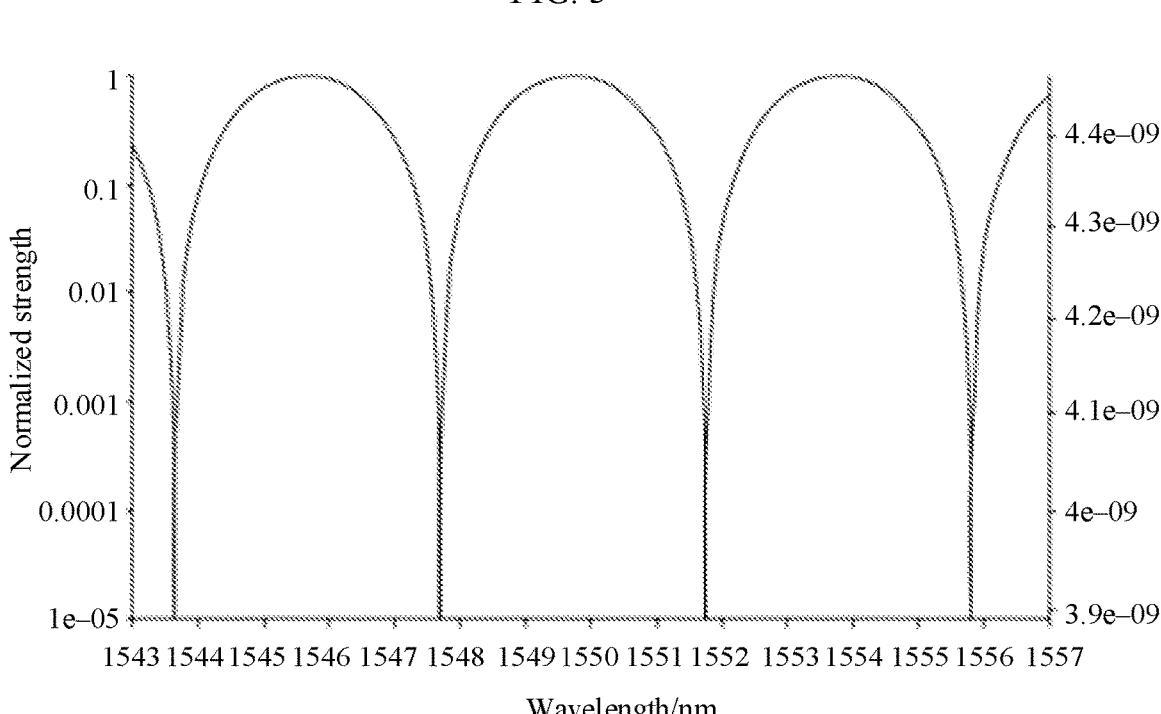
FIG. 4 is a schematic diagram of a spectrum of an electromagnetic wave output by a first interferometer in FIG. 3.

The electromagnetic wave signal that is output to the first path is sequentially guided by the waveguide structure 115 to the first interferometer 113 and the second interferometer 114. In an embodiment, the first interferometer 113 is a Mach-Zehnder interferometer (MZI). The first interferometer 113 is configured to receive the electromagnetic wave signal and cause interference to the electromagnetic wave signal, so that it may output two electromagnetic wave signals based on the electromagnetic wave signal. Spectra of the two electromagnetic wave signals output by the first interferometer 113 are shown in FIG. 4. In FIG. 4, a horizontal coordinate indicates a wavelength, and a vertical coordinate indicates a signal strength.

Still as shown in FIG. 3, the two electromagnetic wave signals output by the first interferometer 113 are transmitted to the second interferometer 114. In an embodiment, the second interferometer 114 is a multimode interferometer (MMI). The second interferometer 114 is configured to receive the two electromagnetic wave signals and cause interference to the two electromagnetic wave signals, to output four electromagnetic wave signals. The electromagnetic wave signals output by the second interferometer 114 are each defined as the foregoing second electromagnetic wave signals.

In another embodiment, a quantity of input signals of the second interferometer 114 may not be two, and a quantity of output signals of the second interferometer 114 may not be four. For example, in one embodiment, the second interferometer 114 may have four inputs and six outputs, in another embodiment, the second interferometer 114 has two inputs and two outputs, and in still another embodiment, the second interferometer 114 has four inputs and four outputs.

There is a preset phase shift between the plurality of second electromagnetic wave signals output by the second interferometer 114. To be specific, the plurality of second electromagnetic wave signals output by the second interferometer 114 are sequentially numbered 1, 2, 3, . . . , and there is a preset phase shift between every two second electromagnetic wave signals whose numbers are adjacent (for example, a number 1 is adjacent to a number 2, and the number 2 is adjacent to a number 3). In addition, in this embodiment, the preset phase shifts between every two second electromagnetic wave signals whose numbers are adjacent are the same.

In this embodiment, the second interferometer 114 outputs four second electromagnetic wave signals, and there is a preset phase shift of $\pi/2$ between the four second electromagnetic wave signals in sequence. When the second interferometer 114 has two outputs, there is a preset phase shift of $\pi$ between the two second electromagnetic wave signals. When the second interferometer 114 has six outputs, there is a preset phase shift of $\pi/3$ between the six second electromagnetic wave signals in sequence. To be specific, in the second electromagnetic wave signals output by the second interferometer 114, a maximum phase shift is $2\pi$. Therefore, the preset phase shift between the second electromagnetic wave signals may be adjusted by adjusting a quantity of the second electromagnetic wave signals output by the second interferometer 114. When the maximum phase shift between the plurality of second electromagnetic wave signals output by the second interferometer 114 is fixed, a larger quantity of the second electromagnetic wave signals output by the second interferometer 114 indicates a smaller preset phase shift between two adjacent second electromagnetic wave signals.

The second interferometer 114 outputs at least two second electromagnetic wave signals. A larger quantity of second electromagnetic wave signals output by the second interferometer 114 indicates more accurate wavelength information of the first electromagnetic wave signal measured by the wavelength measurement system 10.

In this embodiment, the four second electromagnetic wave signals may be transmitted to the photoelectric detector 12. The electromagnetic wave signal of the second path is propagated by using the waveguide structure 116, and is transmitted to the photoelectric detector 12 as a third electromagnetic wave signal. The photoelectric detector 12 is configured to separately convert the received second electromagnetic wave signals and third electromagnetic wave signal into electrical signals through photoelectric conversion.

Figure 5:
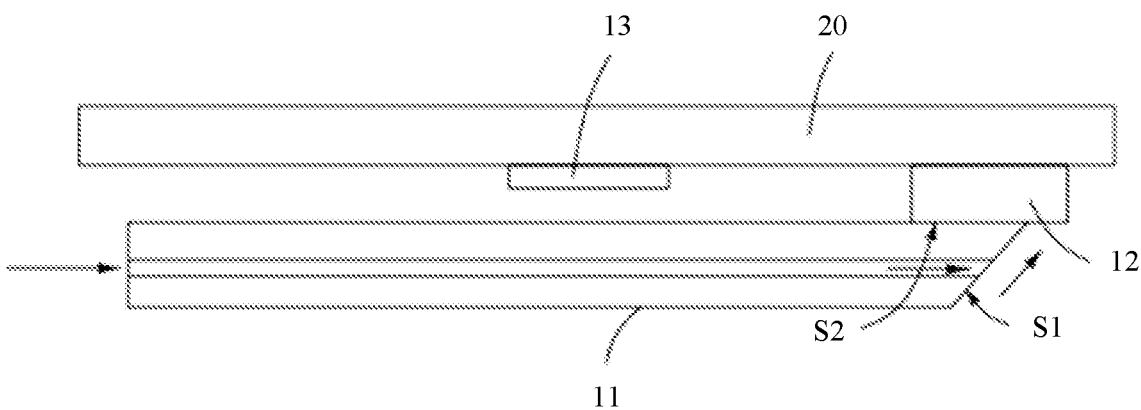
FIG. 5 is a schematic diagram of a structure of a wavelength measurement system according to an embodiment of this disclosure.

As shown in FIG. 5, in this embodiment, the processor 13 is disposed on a printed circuit board (PCB) 20. A conductive wire (not shown in the figure) is formed in the PCB 20, and the plurality of photoelectric detectors 12 are electrically connected to the processor 13 through the conductive wire. The processor 13 is configured to receive the electrical signals generated by the photoelectric detector 12, and is configured to obtain a wavelength of the first electromagnetic wave signal based on the electrical signals by using a preset algorithm.

An end face (namely, an end face for outputting the second electromagnetic wave signal and the third electromagnetic wave signal) that is on the wavelength measurement chip 11 and that is coupled to the plurality of photoelectric detectors 12 is defined as a coupling plane S1. Each photoelectric detector 12 has a sensing zone S2. The sensing zone S2 is a zone that is on the photoelectric detector 12 and that can effectively receive an electromagnetic wave signal for photoelectric conversion. To effectively use an area of the sensing zone S2, a zone in which the coupling plane S1 outputs the second electromagnetic wave signal and the third electromagnetic wave signal needs to be aligned with the sensing zone S2 as much as possible.

In this embodiment, on the basis of meeting the foregoing alignment requirement, a coupling manner between the photoelectric detector 12 and the wavelength measurement chip 11 is further set to adjust difficulty of packaging of the wavelength measurement chip 11.

Still as shown in FIG. 5, in this embodiment, the photoelectric detector 12 is disposed on the PCB 20, and a plane on which the sensing zone S2 of the photoelectric detector 12 is located is parallel to a plane on which the second electromagnetic wave and the third electromagnetic wave signal are propagated on the wavelength measurement chip 11.

Transmission directions of the second electromagnetic wave signal and the third electromagnetic wave signal that are output by the wavelength measurement chip 11 need to be changed on the coupling plane S1, so that the second electromagnetic wave signal and the third electromagnetic wave signal enter the photoelectric detector 12 in a direction pointing to the sensing zone S2 of the photoelectric detector 12. In this case, the coupling plane S1 is an oblique plane.

Figure 6:
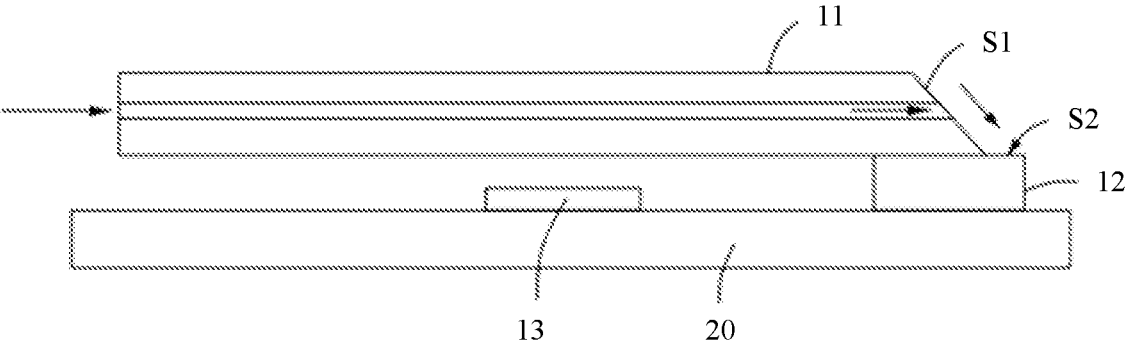
FIG. 6 is a schematic diagram of a structure of a wavelength measurement system according to a changed embodiment of this disclosure.

FIG. 6 shows another structure of the coupling plane S1. The structure of the coupling plane S1 shown in FIG. 6 is similar to the structure of the coupling plane S1 shown in FIG. 5. A difference lies in that oblique directions of the coupling plane S1 are different. Details are not described again.

Figure 7:
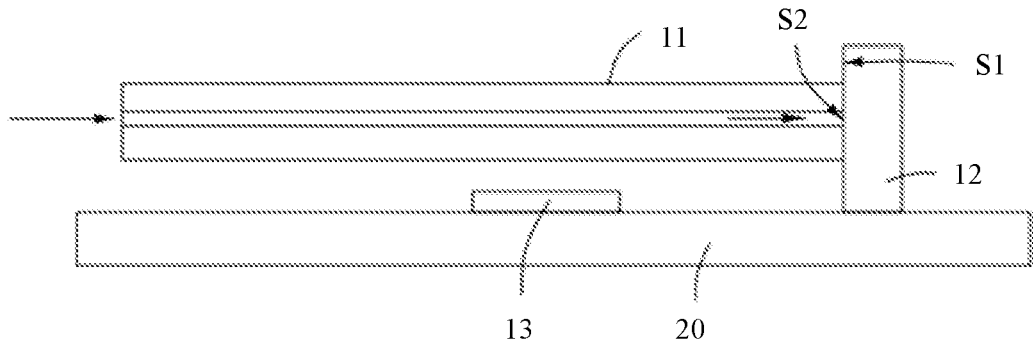
FIG. 7 is a schematic diagram of a structure of a wavelength measurement system according to another changed embodiment of this disclosure.

FIG. 7 shows still another structure of the coupling plane S1. In FIG. 7, the coupling plane S1 is disposed in parallel with a plane on which the sensing zoneS2 of the photoelectric detector 12 is located. The transmission directions of the second electromagnetic wave signal and the third electromagnetic wave signal are perpendicular to the coupling plane S1, that is, perpendicular to the sensing zone S2. In this case, the second electromagnetic wave signal and the third electromagnetic wave signal can directly enter the photoelectric detector 12 after being output from the coupling plane S1, and the transmission directions of the second electromagnetic wave signal and the third electromagnetic wave signal do not need to be changed.

Compared with the position relationships between the coupling plane S1 and the photoelectric detector 12 shown in FIG. 5 and FIG. 6, the position relationship between the coupling plane S1 and the photoelectric detector 12 shown in FIG. 7 does not need to change the transmission directions of the second electromagnetic wave signal and the third electromagnetic wave signal on the coupling plane S1. This helps simplify a manufacturing process of the wavelength measurement chip 11.

In the structures shown in FIG. 5 and FIG. 6, the wavelength measurement chip 11, the photoelectric detector 12, and the PCB 20 are sequentially stacked, and there is no protrusion structure perpendicular to a direction of the wavelength measurement chip 11. However, in the structure shown in FIG. 7, a height of the photoelectric detector 12 is greater than a height of the wavelength measurement chip 11. Therefore, when the chip is packaged, there is a protrusion structure perpendicular to a direction of the wavelength measurement chip 11 at a position at which the photoelectric detector 12 is disposed. Therefore, compared with the structure shown in FIG. 7, the structures in FIG. 5 and FIG. 6 are more conducive to packaging.

For ease of packaging, in the structure shown in FIG. 7, the photoelectric detector 12 may be usually disposed at a height equal to that of a packaged wavelength measurement chip 11 by disposing a riser layer. In another aspect, the photoelectric detector 12 and the packaged wavelength measurement chip 11 are disposed at the same height, so that the second electromagnetic wave signal and the third electromagnetic wave signal are output to the sensing zoneS2 of the photoelectric detector 12 as much as possible, to make full use of the sensing zoneS2 of the photoelectric detector 12.

Figure 8:
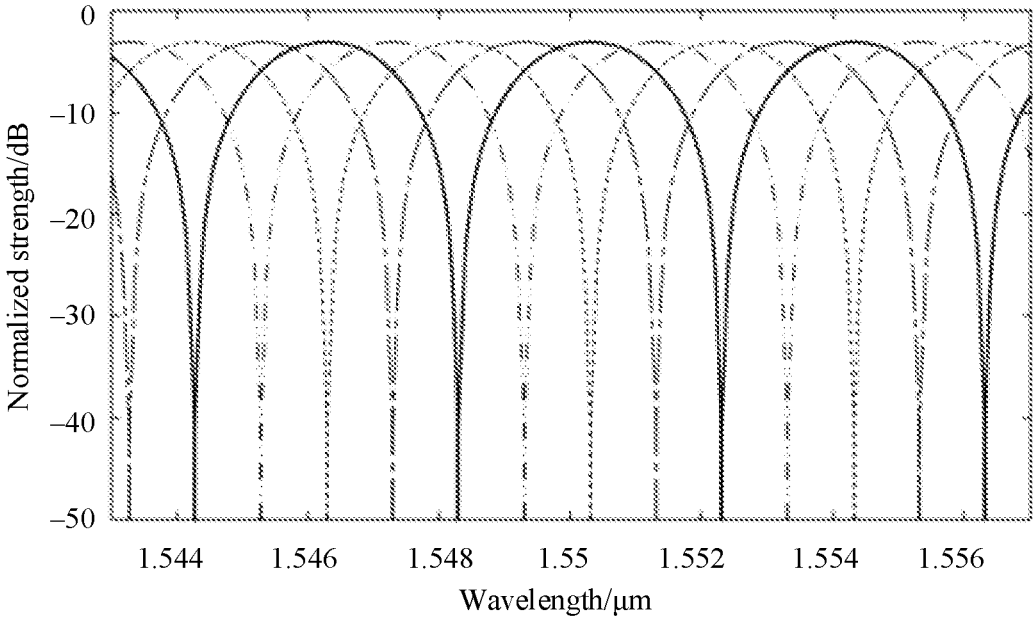
FIG. 8 is a schematic diagram of a spectrum of an electromagnetic wave output by a second interferometer in FIG. 3.

In this embodiment, the four second electromagnetic wave signals output by the second interferometer 114 may form a spectral image shown in FIG. 8. In FIG. 8, a horizontal coordinate indicates a wavelength, and a vertical coordinate indicates a signal strength. Spectral images of the four second electromagnetic wave signals are respectively displayed by using four different lines.

As shown in FIG. 8, if a value λ1 is taken on the horizontal coordinate, the value 21 on the horizontal coordinate corresponds to a plurality of vertical coordinates (that is, one wavelength value corresponds to a plurality of strength values). When the horizontal coordinate 21 is determined, a plurality of strength values corresponding to the horizontal coordinate 21 are determined. However, it can be learned from FIG. 8 that the spectral image is regularly and periodically arranged, and that λ1 is corresponding to the plurality of strength values repeatedly appears once in each subsequent cycle. For example, in a next cycle, a plurality of strength values corresponding to λ2 are the same as the plurality of strength values corresponding to λ1. Therefore, when a group of strength values are determined, a wavelength value cannot be uniquely determined.

In this embodiment, a wavelength value is uniquely determined based on the third electromagnetic wave signal output from the second path. A strength of the third electromagnetic wave signal output from the second path is inversely proportional to a wavelength of the third electromagnetic wave signal, and there is a unique correspondence between the strength and a value of the wavelength. At a moment, when the photoelectric detector 12 obtains a signal strength, the processor 13 can obtain a plurality of wavelength values based on spectra shown in FIG. 8, and the processor 13 can obtain a unique wavelength value based on the strength of the third electromagnetic wave signal output from the second path. Among the plurality of obtained wavelength values, a wavelength value closest to the obtained unique wavelength value is calibrated as a wavelength value of the first electromagnetic wave.

Figure 9:
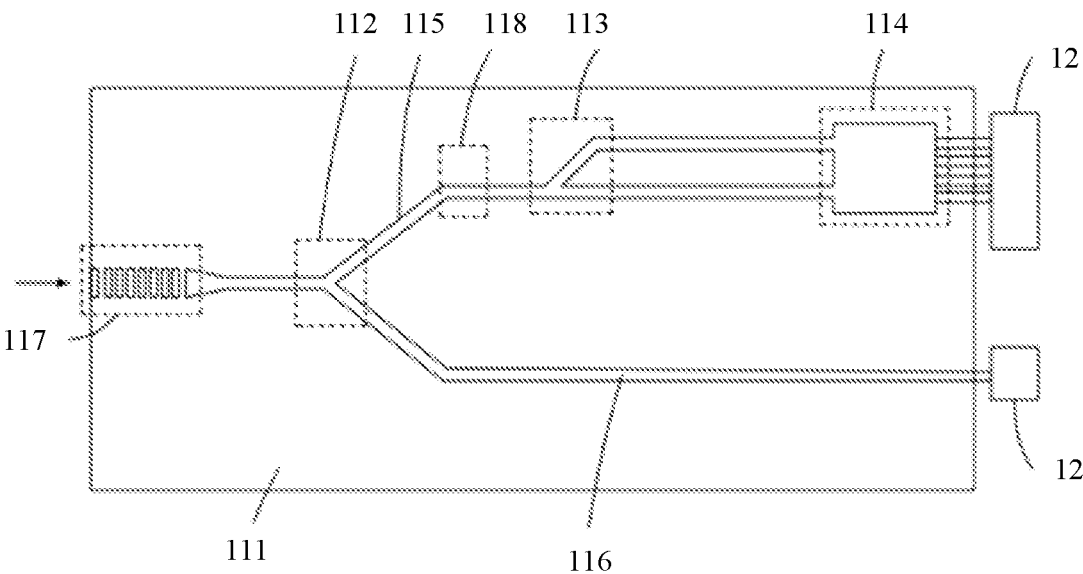
FIG. 9 is a schematic diagram of another plane structure of a wavelength measurement chip in FIG. 2.

As shown in FIG. 9, the wavelength measurement chip 11 in this embodiment includes a substrate 111. The substrate

111 is made from a semiconductor material, for example, silicon oxide. The substrate 111 is configured to carry the optical splitter 112, the first interferometer 113, the second interferometer 114, and the waveguide structures 115 and 116.

The wavelength measurement chip 11 further includes a coupler 117 disposed on the substrate 111. The coupler 117 is a spotsize converter grating (SSC grating). The coupler 117 is coupled to the optical splitter 112 by using a waveguide structure. The coupler 117 is disposed close to an end face on which the wavelength measurement chip 11 receives the first electromagnetic wave signal, and is configured to couple the first electromagnetic wave signal to the optical splitter 112. Compared with a manner in which the optical splitter 112 directly receives the first electromagnetic wave signal, the manner in which the coupler 117 receives the first electromagnetic wave signal and transmits the first electromagnetic wave signal to the optical splitter 112 is more conducive to reducing an input loss of the first electromagnetic wave signal. This arrangement improves an accuracy of the wavelength information measured by the wavelength measurement chip 11.

The wavelength measurement chip 11 in this embodiment further includes a high-order mode filter 118 disposed on the substrate 111. The high-order mode filter 118 is coupled between the optical splitter 112 and the first interferometer 113, and is configured to reduce a high-order mode of an electromagnetic wave transmitted in the first path. Disposing the high-order mode filter 118 between the optical splitter 112 and the first interferometer 113 increases an extinction ratio of the interferometers (namely, the first interferometer 113 and the second interferometer 114) in the first path, thereby further improving the accuracy of the wavelength information measured by the wavelength measurement chip 11.

The wavelength measurement system 10 provided in some embodiments includes the wavelength measurement chip 11. The wavelength measurement chip 11 includes the substrate 111, and the optical splitter 112. The first interferometer 113 and the second interferometer 114 of the wavelength measurement chip 11 are disposed on the substrate 111. The wavelength measurement chip 11 is configured to receive the first electromagnetic wave signal, and output the plurality of second electromagnetic wave signals and the third electromagnetic wave signal based on the first electromagnetic wave signal. The wavelength measurement system 10 further includes the photoelectric detector 12 and the processor 13 that are electrically connected to each other, the second electromagnetic wave signal and the third electromagnetic wave signal are converted into the electrical signals by the photoelectric detector 12, and the wavelength information of the first electromagnetic wave signal is obtained by the processor 13 based on the electrical signals. The wavelength measurement chip 11 does not need to establish a complex optical system. Compared with wavelength meters conventional technologies, the wavelength measurement system has a simpler structure, which reduces package size and utilized space. In addition, components in the wavelength measurement chip 11 have a compact structure, which further improves reliability of the wavelength measurement chip 11 and the wavelength measurement system 10.

A person of ordinary skill in the art should be aware that the foregoing implementations are merely used to describe the present disclosure, but are not intended to limit the present disclosure. Appropriate modifications and variations made to the foregoing embodiments shall fall within the protection scope of the present disclosure as long as they fall within the substantive scope of the present disclosure.

What is claimed is:

1. An optical chip, comprising:

an optical splitter configured to receive a first electromagnetic wave signal and divide the first electromagnetic wave signal into two electromagnetic wave signals to be output; and a first interferometer and a second interferometer, wherein:

the optical splitter, the first interferometer, and the second interferometer are disposed in sequential order, the first interferometer and the second interferometer are configured to receive one of the two electromagnetic wave signals so that the one electromagnetic wave signal is interfered by each of the first interferometer and the second interferometer to output a plurality of second electromagnetic wave signals, wherein the plurality of second electromagnetic wave signals include more than two second electromagnetic wave signals to achieve better accuracy, and a preset phase shift between every two adjacent second electromagnetic wave signals is the same;

wherein another one of the two electromagnetic wave signals is output as a third electromagnetic wave signal;

wherein the optical chip defines a first path and a second path, and the two electromagnetic wave signals are respectively transmitted along the first path and the second path; and wherein the optical splitter divides the first electromagnetic wave signal into the two electromagnetic wave signals according to a preset proportion to be output, wherein the preset proportion is determined based on optical losses of the first path and the second path.

2. The optical chip according to claim 1, wherein a proportion of the electromagnetic wave signal propagated along the first path in the first electromagnetic wave signal is greater than a proportion of the electromagnetic wave signal propagated along the second path in the first electromagnetic wave.

3. The optical chip according to claim 2, wherein the first path comprises the first interferometer and the second interferometer.

4. The optical chip according to claim 1, wherein the first interferometer is a Mach-Zehnder interferometer, and the second interferometer is a multimode interferometer.

5. The optical chip according to claim 4, wherein the preset phase shift between every two adjacent second electromagnetic wave signals in the plurality of second electromagnetic wave signals can be adjusted by adjusting a quantity of the plurality of second electromagnetic wave signals output by the second interferometer.

6. The optical chip according to claim 5, wherein the second interferometer outputs a quantity of four of the second electromagnetic wave signals, and a preset phase shift between the four electromagnetic wave signals is $\pi/2$.

7. The optical chip according to claim 1, further comprising a coupler, wherein the coupler is configured to receive the first electromagnetic wave and transmit the first electromagnetic wave to the optical splitter.

8. The optical chip according to claim 1, further comprising a high-order mode filter, wherein the high-order mode filter is disposed between the optical splitter and the first interferometer.

9. The optical chip according to claim 1, wherein the optical splitter, the first interferometer, and the second interferometer form a substrate.

10. A wavelength measurement system, comprising:

an optical chip comprising: an optical splitter configured to receive a first electromagnetic wave signal, and divide the first electromagnetic wave signal into two electromagnetic wave signals to be output; a first interferometer and a second interferometer, wherein the optical splitter, the first interferometer, and the second interferometer are disposed in sequential order, and the first interferometer and the second interferometer are configured to receive one of the two electromagnetic wave signals, so that the one electromagnetic wave signal is interfered by each of the first interferometer and the second interferometer to output a plurality of second electromagnetic wave signals, wherein another one of the two electromagnetic wave signals is output as a third electromagnetic wave signal, wherein the plurality of second electromagnetic wave signals include more than two second electromagnetic wave signals to achieve better accuracy, and a preset phase shift between every two adjacent second electromagnetic wave signals is the same;

a photoelectric detector coupled to the wavelength measurement chip, and configured to receive a second electromagnetic wave signal and a third electromagnetic wave signal and convert the second electromagnetic wave signal and the third electromagnetic wave signal into electrical signals; and a processor electrically connected to the photoelectric detector, and configured to obtain wavelength information of the first electromagnetic wave signal based on the electrical signals;

wherein the optical chip defines a first path and a second path, and the two electromagnetic wave signals are respectively transmitted along the first path and the second path; and wherein the optical splitter divides the first electromagnetic wave signal into the two electromagnetic wave signals according to a preset proportion to be output, wherein the preset proportion is determined based on optical losses of the first path and the second path.

11. The wavelength measurement system according to claim 10, wherein the processor is configured to obtain a plurality of wavelength values based on the plurality of second electromagnetic wave signals output by the second interferometer, and determine, from the plurality of wavelength values based on the third electromagnetic wave signal output by the optical splitter, a wavelength value of the first electromagnetic wave signal.

12. The wavelength measurement system according to claim 10, wherein the photoelectric detector has a sensing zone, the wavelength measurement chip defines a coupling plane for outputting the second electromagnetic wave signal and the third electromagnetic wave signal, and the coupling plane is parallel to a plane on which the sensing zone is disposed.

13. The wavelength measurement system according to claim 10, wherein the photoelectric detector has a sensing zone, and a plane on which the sensing zone is disposed is parallel to a plane on which the second electromagnetic wave signal and the third electromagnetic wave signal are propagated on the wavelength measurement chip.

14. The wavelength measurement system according to claim 10, wherein a proportion of the electromagnetic wave signal propagated along the first path in the first electromagnetic wave signal is greater than a proportion of the electromagnetic wave signal propagated along the second path in the first electromagnetic wave.

15. The wavelength measurement system according to claim 10, wherein the first path comprises the first interferometer and the second interferometer.

16. The wavelength measurement system according to claim 10, wherein the first interferometer is a Mach-Zehnder interferometer, and the second interferometer is a multimode interferometer.

17. The wavelength measurement system according to claim 16, wherein the preset phase shift between the plurality of second electromagnetic wave signals can be adjusted by adjusting a quantity of the plurality of second electromagnetic wave signals output by the second interferometer.

18. The wavelength measurement system according to claim 17, wherein the second interferometer outputs a quantity of four of the second electromagnetic wave signals, and a preset phase shift between the four electromagnetic wave signals is $\pi/2$.

19. The wavelength measurement system according to claim 10, further comprising a coupler, wherein the coupler is configured to receive the first electromagnetic wave and transmit the first electromagnetic wave to the optical splitter.

20. The wavelength measurement system according to claim 10, further comprising a high-order mode filter, wherein the high-order mode filter is coupled between the optical splitter and the first interferometer.

\* \* \* \* \*